V. S. HARDEY.
ELECTRIC METERING SYSTEM.
APPLICATION FILED SEPT. 7, 1915.

1,191,177.

Patented July 18, 1916.
3 SHEETS—SHEET 1.

Witnesses:
Robert H. Weir
Arthur N. Carlson

Inventor
Virgil S. Hardey
By Brown, Hanson & Boettcher
Attys.

V. S. HARDEY.
ELECTRIC METERING SYSTEM.
APPLICATION FILED SEPT. 7, 1915.

1,191,177.

Patented July 18, 1916.
3 SHEETS—SHEET 2.

Witnesses:
Robert H. Weir
Arthur W. Carlson

Inventor
Virgil S. Hardey
By Brown, Hanson & Boettcher
Attys

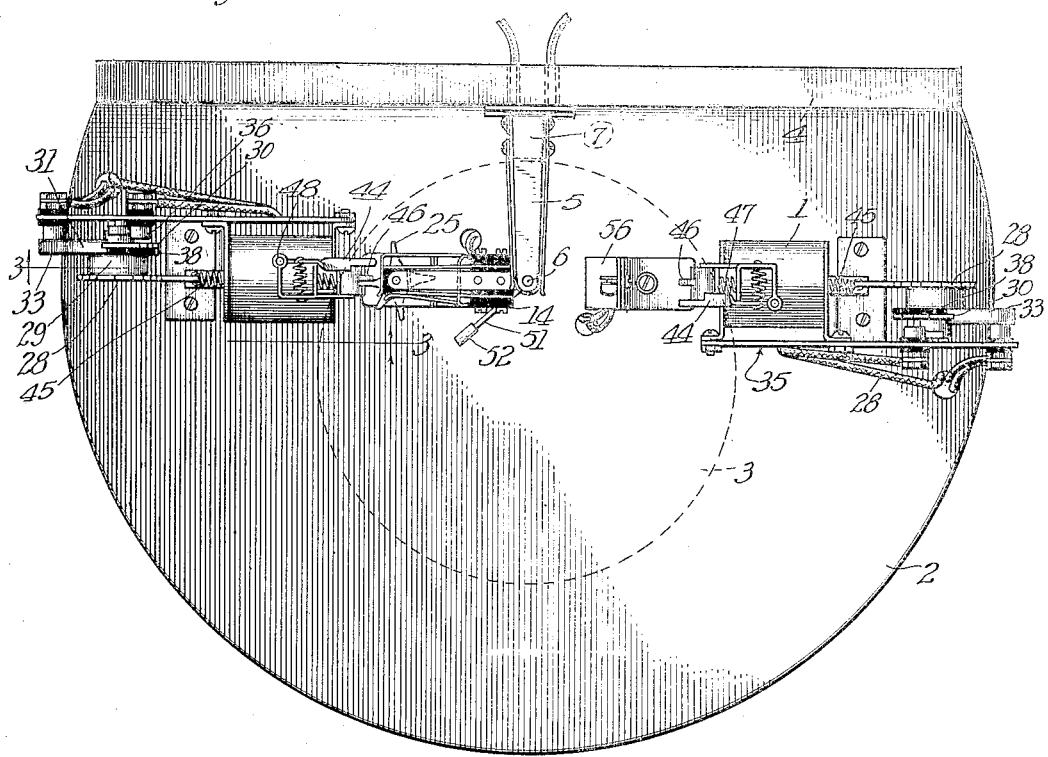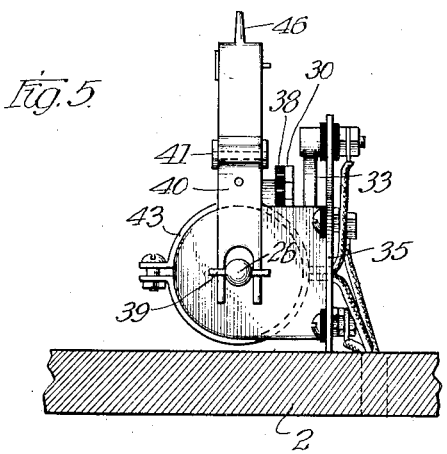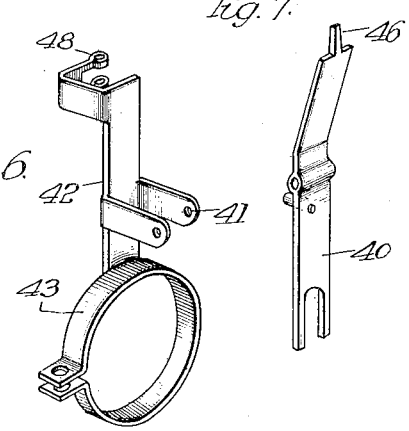

UNITED STATES PATENT OFFICE.

VIRGIL S. HARDEY, OF CHICAGO, ILLINOIS.

ELECTRIC METERING SYSTEM.

1,191,177.   Specification of Letters Patent.   Patented July 18, 1916.

Application filed September 7, 1915. Serial No. 49,369.

*To all whom it may concern:*

Be it known that I, VIRGIL S. HARDEY, a citizen of the United States, residing at Chicago, in the county of Cook and State of Illinois, have invented a certain new and useful Improvement in Electric Metering Systems, of which the following is a full, clear, concise, and exact description, reference being had to the accompanying drawings, forming a part of this specification.

This invention teaches an improvement in the art of electric metering and explains particularly a system for accumulating the reading of a number of registering devices, such as wattmeters or the like, and making a suitable registration of the same, such as may be employed in a maximum demand metering system.

Electric power is very generally sold upon a basis of maximum power demand. It is often desirable for the consumer to employ wattmeters in each large sub-circuit because of the practical limits of the instrument or of a desire to keep a record of the power consumption of each circuit. Where the payment for power is based upon maximum demand it is then necessary to integrate the readings of the different instruments over a given period of time to ascertain the total of each period in order to ascertain the greatest demand during any period. This has been accomplished heretofore by employing a printing meter, commonly termed a printometer, with each meter and then manually integrating the results. This requires a greater number of expensive pieces of apparatus and besides is very laborious. Mechanical devices have been proposed in the prior art but the insurmountable objection of inaccuracy has prevented their common adoption.

The object of my invention is to provide an improved system of accumulating the registration of a number of registering devices into a grand or total registration.

A further object is the provision of an accurate system of maximum demand metering.

Figure 1:
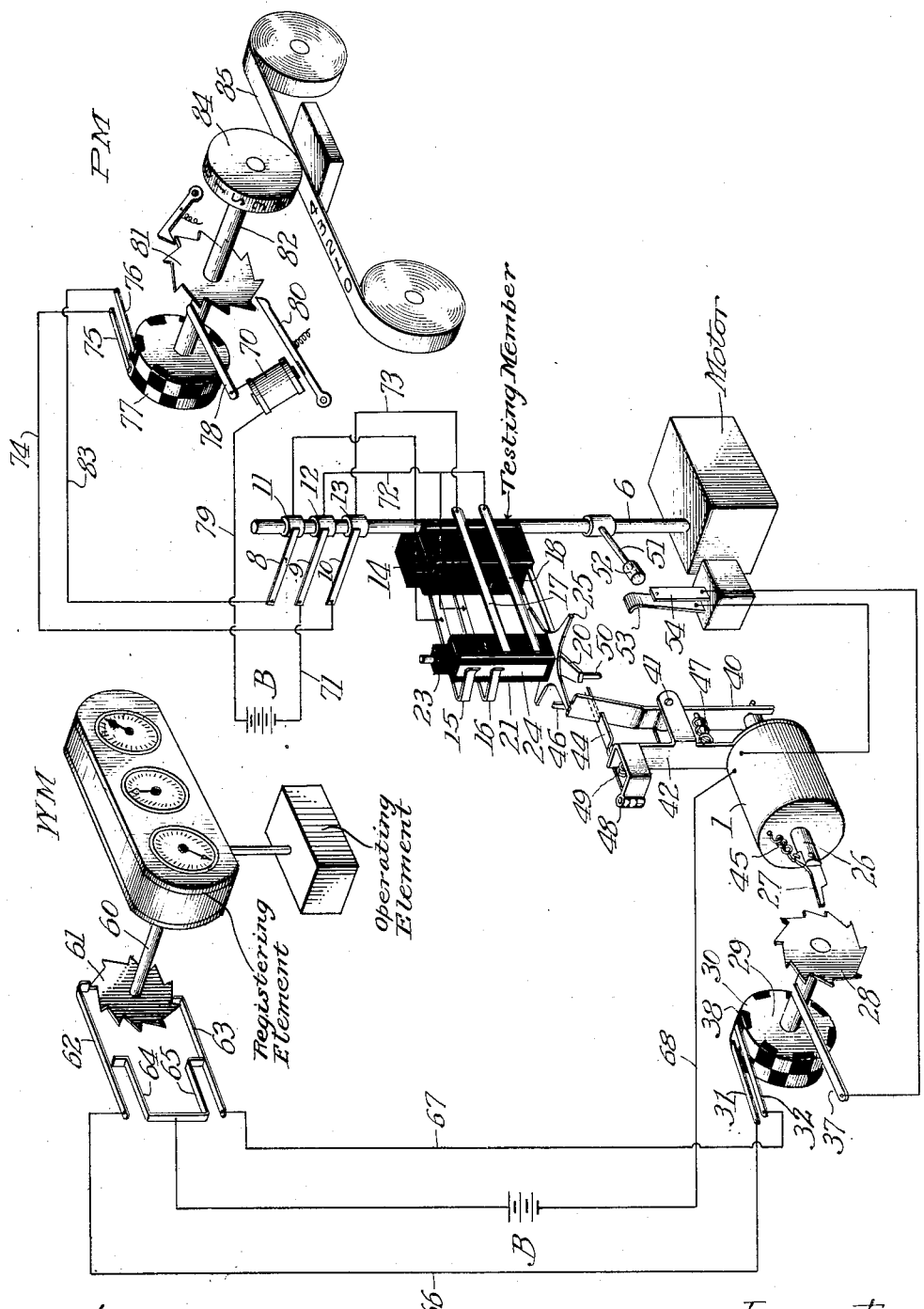
Figure 2:
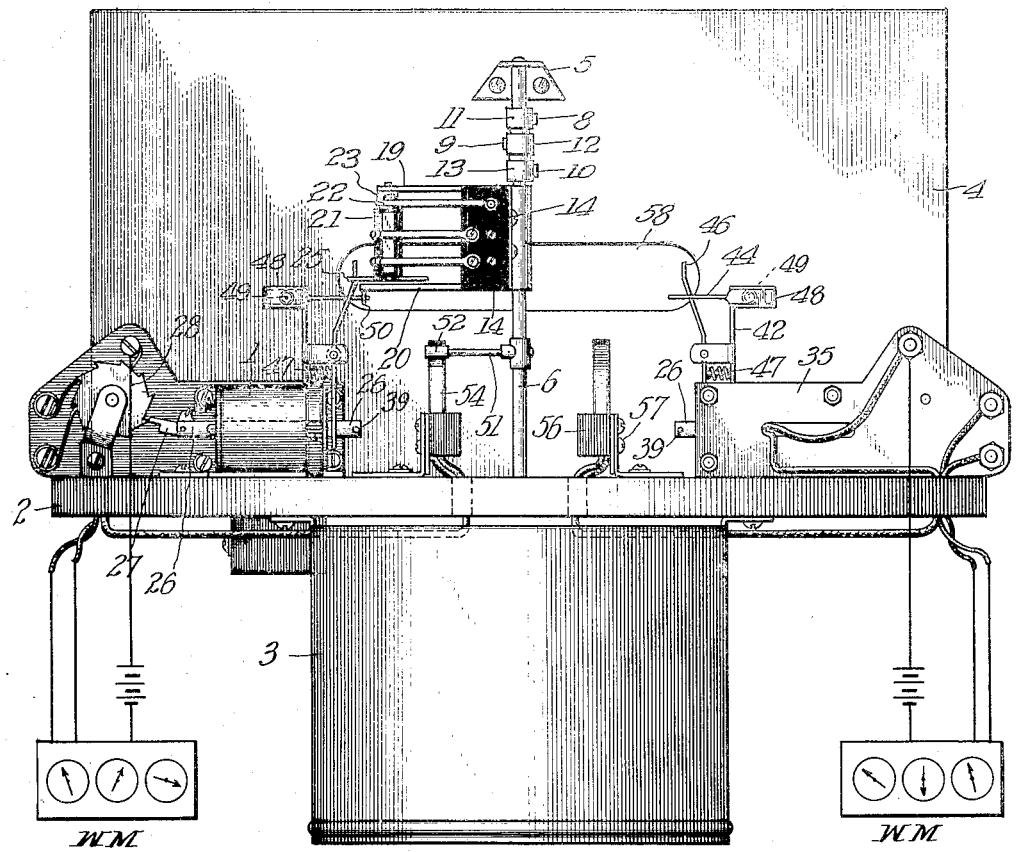
Figure 3:
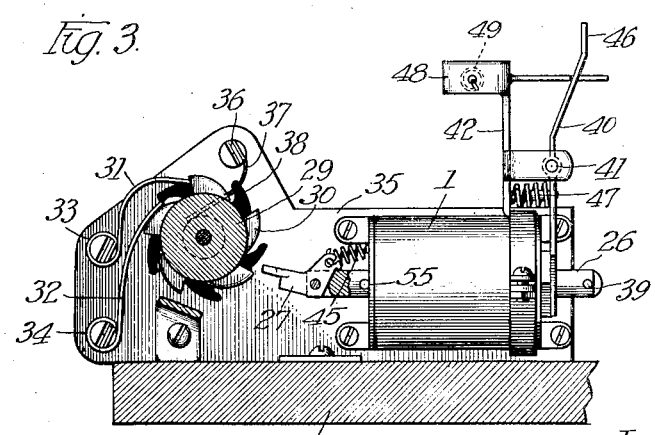

In the accompanying drawings in which I have illustrated one embodiment of my invention, Figure 1 shows diagrammatically and in perspective the circuit and the manner of operation of my invention; Fig. 2 is a front elevation of the accumulating relay board and the mechanical accumulating mechanism; Fig. 3 is an enlarged detail view illustrating the structure of the relay and circuit changing device; Fig. 4 is a plan view of the mechanism shown in Fig. 2; Fig. 5 is an end elevation of the structure shown in Fig. 3; Figs. 6 and 7 are perspective views of details of construction.

Each metering circuit has a relay 1 mounted upon the base-board 2 upon which is mounted the driving motor 3 contained in a suitable case to exclude dust, etc. A back-board 4 is secured to the base-board 2 and serves to support a bracket 5 in which the driving shaft 6 has its upper bearing. The shaft 6 is preferably back-geared to the electric motor 3 to secure a suitable rate of rotation. The back-board 4 supports a block of insulation, shown in dotted lines in Fig. 4, to which block are fastened the springs 8, 9 and 10 bearing upon suitable collector rings 11, 12 and 13 which are fastened to and rotate with the shaft 6. A block of insulation 14 is secured to and rotates with the shaft 6. This block 14 carries two pairs of spring contacts namely the longer pair 15, 16, and the shorter pair 17, 18, of which the springs 16 and 18 are tied together and connected to the collector ring 12 and the springs 15 and 17 are connected to the collector rings 11 and 13, respectively. The block of insulation 14 carries a pair of brackets 19 and 20 extending outwardly from the top and bottom thereof respectively.

A rotatable circuit-changing switch device 21 is provided with bearings in the brackets 19 and 20 and is normally held in one of its four positions by a pair of springs 22 which bear upon a reduced flattened portion 23 of the switching device 21. The springs 22 have been omitted from Fig. 1 for the sake of clearness. Their sole function is to hold the switching device yieldingly in one of its four positions. The rotatable switching device 21 is provided with a pair of inlaid contact strips 24 which are disposed on opposite faces. It can be seen that as the movable contact device 21 is rotated the contact strip 24 will alternately close the circuit between the pair of springs 15, 16, and then springs 17 and 18 so as to change the circuit condition, as will be described later. A star-wheel 25 having four points is secured to the switch block 21 and rotates therewith.

The group of elements of which the shaft 6 is the central element and which makes the test of the movable elements or tripping devices grouped about the shaft 6, is termed in this specification and claims as the testing member or as the testing device, these terms being synonymous as used herein.

Each of the setting relays 1 is provided with a plunger 26 which bears upon its outward end a spring pawl 27 which coöperates with a ratchet wheel 28 to operate a circuit-changing wheel 29 having the conducting portion 30 and the non-conducting portion 38. A pair of springs 31 and 32 are mounted in insulated posts 33 and 34 which are secured to the frame or base plate 35. The rear end of the solenoid plunger 26 bears a cross-pin 39 which engages the lower end of an engagement piece 40 which is pivoted at 41 to a bracket member 42. The bracket member 42 is secured to the body of the electro-magnet 1 by means of a slip ring or clamp 43. It is obvious that this bracket may be secured in any manner for the movable engagement member 40 and the latch 44. The plunger 26 of the relay 1 is normally held in retracted position by means of the spring 45 and the engagement piece 40 is normally held so that its upper end 46 is out of the path of the prongs of the star-wheel 25 by the spring 47. When the solenoid of relay 1 is energized the plunger 26 is moved forward to rotate the ratchet wheel 28 one step and at the same time the pin 39 which is secured to the back end of the plunger 26 moves the engagement piece 40 about its pivot 41 to bring the finger 46 in the path of one of the spurs of the star-wheel 25. At the same time the latch 44 which is pivoted at 48 on the bracket 42 and held by the spring 49 drops back of the engagement piece 40 and holds the end 46 outward until the latch 44 is released. The bearing arm 20 which is secured to the block of insulation 14 and forms the lower bearing for the switch block 21 extends slightly forward and bears a pin 50 which engages the end of the latch 44 after the star-wheel 25 has been engaged by the end 46 of the engagement piece and moved around a quarter of a revolution. The pin 50 then trips the latch 44 and the engagement piece 40 goes back under the influence of the spring 47 to be out of the way of the star-wheel 25.

The group of elements which secures the result of placing the pins 46 in the path of the star wheel 25 which wheel is a part of the movable member or testing device, I term herein the movable element or tripping device, these terms being synonymous as employed herein.

The rotating shaft 6 has secured thereto, slightly in the rear of the block 14, an arm 51 bearing an insulated roller or cap 52 for engaging the longest spring 53 to break the circuit at the springs 53 and 54. The springs 53 and 54 are included in the circuit of the relay 1 and the arm 51 is so placed angularly that the circuit for the relay will be open during the time that engagement occurs between the star-wheel 25 and the movable finger piece 46. The plunger 26 of the relay 1 is prevented from turning by means of the pin 55 which extends into a slot in the plate 35.

While I have shown only two setting relays 1 mounted upon the base-board 2, it is to be understood that as many of these relay devices may be mounted on the base-board as there are wattmeters to be employed. Each relay is provided with its own actuating circuit connecting it to its wattmeter and is provided with its spring pair 53 and 54 mounted in line with the central shaft 6 so that as the star-wheel and switching device are operated by the engagement finger being thrown out into the path of the star-wheel the contact springs 53 and 54 will be open to prevent energization of the relay 1 at the time when the star-wheel 25 is in proximity to the engagement piece and in such position that incorrect actuation might result. The contact springs 53 and 54 are mounted in a block of insulation 56 which is secured by a suitable bracket 57 to the base-plate 2. The various electric wires and cables may be secured to the bottom of the base-plate 2 and pass up through suitable openings adjacent to the point where they are to be attached. The back-plate 4 is preferably cut away at the level of the star-wheel 25 so that the shaft 6 may be brought closer to the back-plate without causing interference of the same with the rotating parts.

I shall now explain the operation of the system in connection with the circuit diagram shown in Fig. 1. While I have shown but a single wattmeter and a single setting relay 1, it is to be understood that there may be as many meters as desired and each meter will be provided with a suitable setting relay 1, these relays being grouped about the central testing spindle 6 as is indicated in Figs. 2 and 4. Each of the setting relays 1 is connected to a corresponding wattmeter WM which is actuated by a suitable motor or operating element rotating in proportion to the amount of power employed to move the pointers over the dials for indicating the power consumed. At the same time the motor or operating element drives a shaft 60 which bears a suitable cam, or ratchet wheel 61, having any desired number of teeth or cam surfaces for breaking and making the operating circuit of the relay 1. The ratchet or cam wheel 61 engages a pair of light contact springs 62 and 63 which are fastened to a suitable block of insulation and normally tend to make contact with the grounded springs 64 and 65 which are tied together and connected to one side of the battery B. It is to be noted that the teeth or cam surfaces of the ratchet wheel 61 are so arranged that one of the springs 62, 63 will be in contact with the ground springs and the other will be out of contact. The spring 62 is connected by wire 66 to the brush 31 which bears upon the commutating or circuit-changing wheel 29. The brush or spring 63 is connected by wire 67 to the brush 32 which also bears upon the commutating wheel 29. The grounded springs 64 and 65 are connected to the grounded side of battery B, the other side of which is connected by wire 68 to one terminal of the setting relay 1 which has its other terminal connected to the contact springs 53, 54, and thence to the grounded spring 37 which bears upon the hub of the wheel 29. As the apparatus is shown in Fig. 1, contact has just been made between the springs 63 and 65, closing a circuit through the wire 67, spring 32 to the conducting portion of the circuit-changing wheel 29, to the ground spring 37, contacts 53 and 54, winding of the relay 1, back to battery B. In the condition of the apparatus shown in Fig. 1, it is assumed that the electromagnet of the relay 1 has just operated to move the contact wheel 29 forward so as to bring the insulated portion 38 of the wheel 29 under the spring 32. This has closed the circuit between spring 31 and the contact wheel 29 so that when the contact spring 62 of the wattmeter closes against the grounded spring 64, an operating circuit for the relay 1 will be closed over the wire 66. This arrangement is provided so that the circuit may be broken at the contact wheel 29 rather than at the springs 62 and 63 which are made very light so as to interfere as little as possible with the movement of the wattmeter mechanism. As the setting relay 1 has just been energized the movable finger 46 will lie in the path of the star-wheel 25 and as the shaft 6 rotates in the direction of the arrow, shown in Fig. 1, the inlaid metal strip 24 will be moved out from under the springs 15, 16 and brought under the springs 17 and 18 to close the circuit through these springs. This is caused by a quarter rotation of the switch-block 21 due to the engagement of the star-wheel and the finger 46. Immediately after shifting of the switch-block 21, the pin 50 engages the latch 44 to release the movable member 40 and to allow it to restore. During the time that the star-wheel 25 engaged the finger 46 and shortly thereafter the arm 51 was in engagement with the spring 53 and opened the circuit of the relay 1 at the springs 53 and 54. It is to be understood that the break caused by the arm 51 in separating the springs 53 and 54 is to be of considerable less duration than the time of contact made between the springs 63 and 65 at the wattmeter. This is done so that no registration will be lost. When the metal contact 21 closes the circuit between springs 17 and 18 a circuit for the actuating magnet 70 of the printing meter PM will be formed as follows: from the battery B, wire 71, contact spring 9, collector ring 12, wire 72 to the spring 18, contact 24, spring 17, wire 73, to the collector ring 13, thence to the brush 10 to the wire 74 to the brush 75 which bears upon the conducting portion of the circuit-changing wheel 77, thence to the spring 78, the magnet 70, wire 79 back to battery B. This circuit causes energization of the magnet 70 which attracts its armature 80 and moves the ratchet wheel 81 forward one step to bring the spring 75 upon an insulating portion of the wheel 77 and the spring 76 upon a conducting portion of the wheel so that when circuit is broken at the springs 17, 18 and made at the springs 15, 16, the circuit for the magnet 70 will be made over the wire 83 and the spring 76. The outer end of the shaft 82 bears a suitable type wheel 84 which may be arranged in a well known manner to print a record upon the paper strip 85.

Inasmuch as the mechanism of the printing meter forms no part of my invention, I shall not illustrate or describe this mechanism inasmuch as the same is well known in the art. It is to be understood, however, that the printing mechanism may be provided with suitable time-controlled actuating mechanism and means for resetting the type wheel, as is well understood in the art. It can now be seen that upon each closure of the circuit for the setting relay 1, it will set up its movable engagement finger 46 to be engaged by one of the spurs of the star-wheel 25 when the same is brought around by rotation of the shaft 6. It is to be understood that the speed of rotation of the shaft 6 must be such that a complete revolution will be made in less time than the time between energization of the relay 1 so that successive energizations of the relay 1 will not merge together and thus one of them lost. As many of the relays 1 may be employed as are required to serve the desired number of primary meters.

It can be seen that I have provided a system of the utmost reliability in that under no condition of operation will it be possible for a registration to be lost either because of successive energizations of the relay 1 becoming merged or because of the relay being actuated at the time that the star-wheel 25 is in the way.

The system I have shown consists essentially of a number of primary operating devices such as watt meters, each of which controls a movable element or tripping device, such as the engagement member 40, having the finger 46, and a register, such as the printing meter P. M., which is common to a plurality of the primary operating devices. The register is controlled through a movable member which is adapted to test the movable elements or tripping devices of each of the primary operating devices in turn, to find out whether a predetermined condition or action, such as the addition of another unit has occurred. The occurrence of the condition or action is evidenced by setting of the movable element or tripping device 40. The system is further characterized by a simultaneous guarding against interference with actuation or setting of the movable elements while this test is being made. If the test reveals the occurrence of the predetermined condition or action another unit is added to the register and if the test reveals no such occurrence no actuation of the register occurs. It is obvious that this scheme of operation could be carried out with mechanical connections between the primary operating element and the movable elements or tripping devices and is also apparent that the movable member or testing device which tests for the setting up of the movable elements or tripping devices could be mechanically connected instead of electrically. It is also apparent that instead of making the connections either electrically or mechanically the combination of both may be employed.

While I have described my invention with reference to the specific details of one embodiment, it is to be understood that I do not intend to be limited to those details of construction inasmuch as a great number of variations will at once occur to any workman skilled in the art, but I desire that the appended claims which define my invention be construed as broadly as is consistent with the prior art.

What I claim is:

1. In combination a plurality of meters, movable elements each adapted to be set by registration of a predetermined unit upon the corresponding one of said meters, a registering device, a testing member for engaging said movable members when the same are set, means jointly controlled by said testing member and said movable elements for actuating said registering device and means for preventing setting of said movable elements while the test is being made.

2. In combination a plurality of meters, a printing register, a setting relay for each meter, an operating circuit for each relay controlled by the corresponding meter, a pair of contacts in each circuit, movable elements for said relays, said elements being adapted to be set by energization of the corresponding relay, said printing register having controlling means, means to cause engagement between the controlling means of said printing register and any one of said elements when in set position, and means for opening said contacts when said controlling means is in position to engage one of said elements.

3. In combination a plurality of meters, a movable element for each meter, each element adapted to be set in accordance with predetermined advancement of the corresponding meter, common registering mechanism having movable means adapted to engage said movable elements to actuate said registering mechanism and means to prevent setting of said movable elements when the movable means is in position to be engaged.

4. In combination a plurality of meters, movable elements for said meters, setting of said elements being controlled by registration of a predetermined unit upon said meters, a register, having a testing member adapted to test said elements, said elements being adapted when set to engage said testing member and means controlled by engagement of said testing member with one of said elements for causing actuation of said register.

5. In combination a plurality of meters, movable elements for said meters, said elements being set by registration of a predetermined unit upon said meters, a register having a testing member adapted to test said elements, said elements being adapted when set to engage said testing member, operation of said register being controlled by engagement of said testing member with one of said elements, and means to prevent setting of said elements while said testing member is testing the same.

6. In combination a plurality of meters, a plurality of relays, movable elements adapted to be set by energization of said relays, contacts for controlling said relays, said contacts being operated by said meters, testing member for engaging said elements when the same are set, a registering device, means including a circuit having suitable contacts for operating said registering device controlled by engagement of said testing member with one of said elements.

7. In combination a plurality of meters, a plurality of relays, movable elements adapted to be set by energization of said relays, contacts for controlling said relays, said contacts being operated by said meters, a testing member for engaging said movable elements when the same are set, a registering device, means including a circuit having suitable contacts for operating said registering device controlled by engagement of said testing member with one of said movable elements, and means to disable the operating circuit of a relay while the test is being made.

8. In combination a rotating shaft, a plurality of relays arranged in an arc of a circle about said shaft, governing means for controlling said relays, a testing member on said shaft, operating fingers adapted to be projected into the path of said testing member by energization of said relays, a register and contact means for controlling the operation of said register, said contact means being controlled by said operating fingers.

9. In combination a rotating shaft, a plurality of relays, arranged in an arc of a circle about said shaft, governing means for controlling said relays, a testing member on said shaft, operating fingers adapted to be projected into the path of said testing member by energization of said relays, a register, contact means for controlling the operation of said register, said means controlled by said operating fingers and means secured to said shaft and rotating with said testing member for disabling each relay circuit in turn.

10. In combination a rotating shaft, a plurality of relays arranged in an arc of a circle about said shaft, circuits for said relays, governing means for controlling said circuits, means controlled by each relay for breaking its own circuit after each energization thereof, a testing member secured to and rotating with said shaft, operating fingers adapted to be projected into the path of said testing member by energization of said relays, a register, contact means for controlling the operation of said register, said contact means being controlled by said operating fingers.

11. In combination a rotating shaft, a plurality of relays arranged in an arc of a circle about said shaft, governing means for controlling said relays, a testing member secured to and rotating with said shaft, operating fingers adapted to be projected into the path of said testing member by energization of said relays, a register, an electromagnet for operating the same, a circuit for said magnet, said circuit being controlled by said operating fingers, and means for causing the energization of said magnet to break its own circuit.

12. In combination a rotating shaft, a plurality of relays arranged in an arc of a circle about said shaft, governing means for controlling said relays, a testing member on said shaft, operating fingers adapted to be projected into the path of said testing member by energization of said relays, latches for holding said operating fingers in projected position, said testing member having means to trip said latches, a register and contact means for governing the operation of said register, said contact means being controlled by said operating fingers.

13. In combination a rotating shaft, a plurality of relays arranged in an arc of a circle about said shaft, governing means for controlling said relays, a testing member on said shaft, operating fingers adapted to be projected into the path of said testing member by energization of said relays, a latch for holding each operating finger in the path of said testing member, said testing member having circuit controlling means and means for tripping said latch, a register and means governed by said contact mechanism for operating said register.

14. In combination a rotating shaft, a plurality of relays arranged in an arc of a circle about said shaft, governing means for controlling each of said relays, a testing member secured to said shaft, operating fingers adapted to be projected into the path of said testing member by energization of each of said relays, a latch for holding each operating finger in extended position, a register, contact means for governing the operation of said register, said contact means being actuated by engagement of said testing member with one of said operating fingers, means carried by said shaft for tripping said latch after the corresponding operating finger has engaged with the testing member and means controlled by rotation of said shaft for disabling the operating circuit of each relay, while the testing member is in position to engage the corresponding operating finger.

15. In combination a plurality of independently actuated primary meters or registers, an accumulating meter or register, a testing member movable in a predetermined path each of said primary meters having an element movable by registration of a predetermined value thereupon, into the said path of the testing member, and means controlled by engagement of said testing member and movable element for actuating said accumulating meter or register.

16. In combination a plurality of independently actuated primary registers, an accumulating register, a testing member movable in a predetermined path, each of said primary registers having an element movable by registration of a predetermined value into the path of said testing member, means controlled by engagement of said testing member with a movable element for actuating said accumulating register and means to restore each movable element.

17. In combination, a plurality of independently actuated primary registers, an accumulating register, a testing member movable in a predetermined path, each of said primary registers having an element movable into the path of said testing member, means controlled by engagement of said testing member with a movable element for actuating said accumulating register, and means to prevent movement of each element into said path while said testing element is in that part of the path where interference could result.

18. In combination, a plurality of independently actuated primary elements, a registering device, a movable testing member having a predetermined path of movement, a contact element normally out of the path of said testing member, each of said primary elements having means adapted to be actuated upon predetermined conditions for causing the corresponding contact element to intersect the path of said testing member, and means governed by engagement of said testing member and an intersecting one of said contact elements for actuating said register.

19. In combination, a plurality of independently actuated primary elements, a registering device, a movable testing member having a predetermined path of movement, contact elements normally out of the path of said testing member, each of said primary elements having means adapted to be actuated upon predetermined conditions for causing said contact element to intersect the path of said testing member, and means governed by engagement of said testing member and an intersecting one of said contact elements for actuating said register, and means to prevent setting of each contact element while the testing member is in the immediate vicinity of said contact element.

20. In combination, a register, a moving testing device, a plurality of normally retracted fingers adapted to be set into the path of said testing device, means governed by engagement of said testing device and one of said fingers for operating said register.

21. In combination, a register, a movable testing device, a plurality of normally retracted fingers adapted to be set into the path of said testing device, means governed by engagement of said testing device and one of said fingers for operating said register, and means operated after contact of said testing device and one of said fingers for permitting said finger to be retracted.

22. In combination, a register, a movable testing device, a plurality of normally retracted fingers adapted to be set into the path of said testing device, means governed by engagement of said testing device, and one of said fingers for operating said register, and means to prevent setting of each finger while the testing device is in front of it.

23. In combination, a register, a movable testing device, a plurality of normally retracted fingers adapted to be set into the path of said testing device, means governed by engagement of said testing device and one of said fingers for operating said register, and means operated in accordance with the position of the testing device for preventing setting of said finger.

24. In combination, a register, a movable testing device, a plurality of normally retracted fingers, said fingers being adapted to be set into the path of said testing device, means governed by engagement of said testing device and one of said fingers for operating said register, means operated after contact of said testing device and one of said fingers for permitting said finger to be retracted and means to prevent setting of each finger while the testing device is in front of it.

25. In combination, a register, a movable testing device, a normally retracted finger adapted to be moved into the path of said testing device, a primary element, means including a normally open circuit adapted to be closed by said primary element to move said fingers into the path of said testing device, means for opening said circuit while said testing device is in front of said fingers, said primary element being adapted to hold said circuit closed for a time longer than that required by the circuit device to pass by said finger.

26. In combination, a register, a movable testing device having a predetermined path of motion, a normally retracted finger lying out of said path, a primary element, means including a circuit controlled by said primary element to move said finger into the path of said testing device, and means for disabling said circuit while said testing device is in front of said finger.

27. In combination, a plurality of primary operating devices, a testing member moving in a predetermined path, register controlling means carried by said testing member, a register, an element for each of said primary operating devices, said elements being stationed along said path and being normally un-set, said elements being adapted to be set by said primary operating devices to govern the register controlling means.

28. In combination, a plurality of primary operating devices, a testing member moving in a predetermined path, register controlling means carried by said testing member, a register, an element for each of said primary operating devices, said elements being stationed along said path and being normally un-set, said elements being adapted to be set by said primary operating devices to govern the register controlling means, and means to prevent setting of an element while said register controlling means is adjacent said element.

29. In combination, a plurality of primary operating devices, a register, a testing member moving in a predetermined path, a circuit changing device carried by said testing member, a circuit for governing operation of said register controlled by said circuit changing device, an element for each of said primary operating devices, said elements being stationed along said path and being normally unset, said elements being adapted to be set by said primary operating devices to govern the circuit changing device.

30. In combination, a plurality of primary operating devices, a register, a testing member moving in a predetermined path, a circuit changing device carried by said testing member, a circuit for governing operation of said register controlled by said circuit changing device, an element for each of said primary operating devices, said elements being stationed along said path and being normally unset, said elements being adapted to be set by said primary operating devices to govern the circuit changing device, and means to prevent setting of an element while said circuit changing device is adjacent said element.

In witness whereof, I hereunto subscribe my name this 3rd day of Sept. A. D. 1915.

VIRGIL S. HARDEY.